United States Patent [19]

Yano et al.

[11] 3,843,803
[45] Oct. 22, 1974

[54] PROCESS FOR PRODUCING FIBERS FROM NATURAL PROTEIN OF ANIMAL ORIGIN

[75] Inventors: Nobumitsu Yano; Hideomi Takahashi; Yoshitaka Hayasho, all of Saitama, Japan

[73] Assignee: Asahi Kasei Kogyo Kabushiki Kaisha, Osaka, Japan

[22] Filed: Sept. 6, 1972

[21] Appl. No.: 286,841

[30] Foreign Application Priority Data

Sept. 13, 1971 Japan.............................. 46-70386
Nov. 15, 1971 Japan.............................. 46-90598
Nov. 15, 1971 Japan.............................. 46-90599

[52] U.S. Cl. .................................. 426/56, 426/276
[51] Int. Cl. ........................................... A23j 3/00
[58] Field of Search .............. 99/14, 17, 18, 20, 21; 264/202; 426/364, 350, 276, 56

[56] References Cited
UNITED STATES PATENTS

| | | | |
|---|---|---|---|
| 2,952,543 | 9/1960 | Szczesniak et al. | 426/276 X |
| 3,210,195 | 10/1965 | Kjelson et al. | 426/276 X |

*Primary Examiner*—James R. Hoffman
*Attorney, Agent, or Firm*—Flynn & Frishauf

[57] ABSTRACT

Protein fibers of protein of animal origin are spun from a spinning dope containing solubilized protein of animal origin and an unsaturated fatty acid or non-toxic salt thereof. The fatty acid, which may be removed by washing after spinning, imparts thread-forming properties to the spinning dope. The animal protein fiber is especially suitable for food products, having improved retention of water and seasonings and better flavor than known plant protein fibers. If desired, solubilised plant protein may be incorporated into the spinning dope.

21 Claims, No Drawings

PROCESS FOR PRODUCING FIBERS FROM NATURAL PROTEIN OF ANIMAL ORIGIN

FIELD OF THE INVENTION

This invention relates to a process for producing fibers from natural protein of animal origin. More particularly, this invention relates to a process for producing fibrous protein, by imparting thread-forming properties to a solution of protein of animal origin and then spinning the resultant prepared dope.

BACKGROUND OF THE INVENTION

There have been many attempts to use various kinds of protein as raw materials for fibers for clothing. However, on account of marked developments in the field of synthetic high polymers since the 1940's, such attempts have been discontinued. Instead, recent investigations have been directed towards the production of edible protein fibers by the use of plant seed protein such as soybean protein. In fact, soybean protein fibers have already been marketed. The protein fibers available at the present stage however, involve many drawbacks. First of all, resistance to the teeth is unsatisfactory when it is bitten. In addition, the beany flavour cannot easily be removed. Moreover, it is not easy to cook because it is difficult to absorb seasonings. A further drawback is that it is poor in nutritive value. Thus, this protein fiber has many drawbacks to be overcome before it is more popular in use. Also, as an animal protein fiber, casein has been investigated as a material for clothing. The casein fibers available at the present stage however, are not suitable for foods on account of insufficient resistance to the teeth, bad smell, etc.

We have made an attempt to produce fibers from a solution of protein of animal origin by mixed spinning, in the prospect that such fibers, which may of course be supplied directly for food, will alleviate the drawbacks of plant protein fibers as mentioned above. However, the protein solution derived from animals is lacking in thread-forming properties as compared with a plant protein solution or a casein solution. By the term "thread-forming properties" we refer to a phenomenon where a trailing thread is formed when a glass rod is dipped in the solution and lifted. Therefore, as we have confirmed, it is impossible to obtain very fine fibrous protein directly from this solution.

There have been proposals concerning fiber formation from fish meat protein. For example, fish meat is thoroughly washed with water and dried at a temperature not higher than 50°C. It is then dissolved in a mixed solvent comprising copper hydroxide, glycerine and caustic soda. From this solution, fish meat protein fibers are obtained by conventional procedures. However, the use of copper hydroxide in the spinning dope, which may be allowable for fibers for clothing, is undesirable for foods.

An object of this invention is to provide animal protein fibers which may be used as foods, and also improve on the inevitable drawbacks of plant protein fibers.

Another object of the present invention is to provide a new method for improving the thread-forming properties of a spinning solution of animal protein, which has been the greatest problem in the production of fibrous protein of animal origin.

A further object of the present invention is to provide a novel process for producing extremely fine fibrous protein.

Other objects and advantages of this invention will become apparent from the following description.

SUMMARY OF THE INVENTION

We have investigated substances which are harmless in foods and may have the effect of improving the thread-forming properties of protein solutions, which has been the main problem to be solved in fibrous protein preparation. Consequently, we have now found that an unsaturated fatty acid for example linoleic acid or linolenic acid, which is conventionally referred to as "Vitamin F," greatly improves the thread-forming properties of the solution of protein of animal origin. Although there has been research into the improvement of thread-forming properties of glycerol, propylene glycol, viscose and the like, no research has been made to improve the thread-forming properties of protein solutions. The improvement achieved in accordance with the present invention makes it possible to produce extremely fine fibers from a solution of animal protein, the spinning of which has hitherto been entirely impossible.

According to the present invention, fibrous protein is produced by forming an aqueous solution containing protein of animal origin and at least one unsaturated fatty acid and/or a nontoxic salt thereof, and spinning fibers from the solution.

The protein of animal origin may be derived from meat portions, internal organs, blood, eggs or roe of esculent animals. In the present invention, "esculent animals" are inclusive of various kinds of fish and terrestial animals such as cattle, pigs, sheep, chicken and rabbit. The internal organs may include heart, liver, lung, tongue, spleen, pancreas, stomach, kidney, intestine, etc.

The protein used as a starting material in the present invention is obtained by homogenizing animal matter, i.e., meat, internal organs, blood, eggs or roe, with sufficient water, subsequently solubilizing the homogenized product according to any conventional procedure such as alkali addition, hydrochloric acid addition or enzyme treatment, precipitating the solubilized product after removal of insoluble substances by a conventional method such as isoelectric precipitation, salting out, etc., and collecting the precipitate. The purity of the protein thus obtained should be at least 85 percent. Ordinarily, for obtaining raw material protein, pH is adjusted to from 10 to 12 while homogenizing minced meat or internal organs with the addition of a sufficient amount of water, and the, after removal of the precipitated portion and fat by means of a centrifuge, pH is lowered to about 5 with mineral acid. Screloprotein such as collagen or ceratin should be subjected to a solubilization treatment by the use of an enzyme such as Collagenade or a S—S bond splitting agent.

The pH and the temperature of the protein solution may be variable depending on the species of protein used. What is critical is to select pH and temperature within such a range that the protein is soluble and hard to be decomposed. In general, however, the optimum condition is when pH is from 10 to 12 and the temperature is from 30° to 60°C.

If the protein solution is heated above said range or brought to a changed state by other factors, for example extreme acidity, thermal denaturalization or other effects may occur. Under such conditions, therefore, protein fiber formation by spinning is rendered impossible since no thread-forming properties are imparted by the addition of an unsaturated fatty acid.

The protein sources which may be used in the present invention to give favorable results are fish flesh, terrestial animal's meat, meat with bones, heart, tongue, etc. On the other hand, lung, intestine, stomach, legs or ears which are rich in collagen are difficult to handle since the procedure for protein separation is rather complicated. Bloods, eggs and roe may also be used.

The concentration of a protein may also be variable depending on the species of the protein. In general however, where only animal protein is used, the concentration thereof is preferably from 5 to 15 percent. However, the animal protein may be used in admixture with plant protein, in which case the total protein concentration may be from 5 to 20 percent. Plant protein, even in high concentration, is generally more fluid than animal protein.

The concentration of the protein solution is preferably adjusted so as to obtain the optimum thread-forming property when the viscosity of the protein solution is approximately from 5,000 to 50,000 centipoise.

The unsaturated fatty acid to be used in the present invention is a fatty acid having one or more unsaturated bonds and having 14 to 22 carbon atoms, for example, myristoleic acid, palmitoleic acid, oleic acid, linoleic acid, linolenic acid, arachidonic acid, or clupanodonic acid, or salts thereof. Any type of salt may be usable, so long as it is of nontoxic nature. For example, salts of sodium, alkaline earth metals such as Ba or Mg, or ammonium salts can be used. Linoleic acid and linolenic acid or salts thereof are most preferably used in the present invention.

DETAILED DESCRIPTION

According to the present invention, unsaturated fatty acids or nontoxic salts thereof are added to various protein solutions in order to impart thread-forming properties thereto. The ground for the choice of these substances will now be explained by referring to the following experiments.

EXPERIMENT 1

About five times as much water is added to 10kg. oxen liver containing about 20 to 25 percent protein. While this mixture is being sufficiently homogenized, it is adjusted to pH 12 by the addition of 10 N-aqueous caustic soda solution. The insoluble substances and fat are removed by a continuous refrigerated centrifuge. The filtrate liquid is gradually stirred, lowered to pH 5.0 by 5-N hydrochloric acid and then the precipitates are collected by means of a centrifugal machine. Thus, 10 kg. liver protein with about 85 percent water content is obtained. Into 100 g of this paste-like protein is added water to make a 200 ml. aqueous solution. Threadforming properties are examined by the use of this dope by adding thereto the substances listed below (all of them may be used in foods). The dope is then well homogenized, while being kept at 40°C. The amount of each substance added is varied, i.e. 5, 10 and 20 percent based on protein, while pH of the dope is varied, i.e., 10, 11 and 12.

TEST SUBSTANCE

1. Organic acid: citric acid, tartaric acid, malic acid, fumaric acid, linoleic acid, linolenic acid.
2. Amino acid: glutamic acid, lysine, alanine, valine, methionine, proline.
3. Oil: peanut oil, cotton oil, sesame oil.
4. Saccharides: glucose, sucrose, fructose.
5. Surface active agents: Sorbitane monooleate, sucrose monooleate, glycerine monooleate.
6. Alcohols: Sorbitol, glycerol.

MEASUREMENT OF THREAD-FORMING PROPERTIES

Each dope prepared according to the above procedure is introduced into a beaker of 200 ml. capacity. A metal cylinder (diameter: 1.5 cm, length: 10 cm.) suspended from a string is dipped into the dope to a depth of about 1 cm. The cylinder is then lifted up at a speed of 5 cm/sec driven by a rotary disc. The maximum length of thread formed between the surface of the dope and the cylinder is measured by means of a scale beam. The average value of three measurements is determined as the thread-forming length.

RESULT

Among the substances listed above, only linoleic acid and linolenic acid are capable of imparting to the dope a thread-forming property as much as 10 cm or more. All the other substances give a value of less than 5 cm. Table 1 shows the results obtained when linoleic acid is used (similar results are also obtained when linolenic acid is used).

TABLE 1

| pH | 10 | 11 | 12 |
|---|---|---|---|
| Amount of linoleic acid: | | | |
| 5% | − | + | + |
| 10% | + | + | +++ |
| 20% | + | ++ | +++ | note)
| − | thread-forming length | less than 5cm |
|---|---|---|
| + | do. | from 5 to 10cm |
| ++ | do. | from 10 to 20cm |
| +++ | do. | more than 20cm |

EXPERIMENT 2

Another experiment was made repeating the procedure of Experiment 1, but using fatty acids similar to linoleic acid and linolenic acid, in which pH is adjusted to 12 and the amount of each fatty acid is varied i.e. 10 and 20 percent. The result is shown in Table 2.

TABLE 2

| Amount of fatty acid (based on protein) | 10% | 20% |
|---|---|---|
| Fatty acid: | | |
| Lauric acid | − | − |
| Myristic acid | − | − |
| Palmitic acid | − | − |
| Stearic acid | − | − |
| Arachidic acid | − | − |
| Myristoleic acid | + | + |
| Palmitoleic acid | + | + |
| Oleic acid | ++ | + |
| Linoleic acid | ++ | +++ |
| Linolenic acid | ++ | +++ |
| Arachidonic acid | + | ++ |
| Clupanodonic acid | + | + | note) the symbols have the same meaning as in Table 1.

As shown by the results in Table 2, all the unsaturated fatty acids tested exhibit the effect of improving the thread-forming properties. Non toxic salts of these unsaturated acids also possess this effect.

The amount of these free or salt-form unsaturated fatty acids may be variable depending on the species of animal protein, pH or temperature. Usually, however, they are used in amounts of 2 percent wt./wt. or more based on animal protein (dry). Since these fatty acids are unsaturated and liable to be changed, e.g., by oxidation, they should not be used in an excess, but preferably in an amount less than 80 percent wt./wt. The most preferred range of the amount of unsaturated fatty acid is from 5 to 20 percent wt./wt. based on animal protein. When protein of animal origin is admixed with plant protein, the amount of fatty acid is still desirably from 5 to 20 percent wt./wt. based on animal protein, without any increase on account of the plant protein. Accordingly, as the proportion of plant protein to animal protein is increased in a mixture thereof, the relative amount of an unsaturated fatty acid based on the total amount of protein, is lowered. Antioxidants may also be added to the dope, if necessary. As an antioxidant any antioxidant which is allowable for use in foods may be in the present invention. For example, sodium ascorbate, dibutyl hydroxy toluene, butyl hydroxy anisole, ethyl protocatechuate, isoamyl gallate, and propyl gallate may be used. Since the unsaturated fatty acids used in the present invention may be removed almost completely by the use of an alcoholic solution such as 70 percent or more water containing alcohol, or an alkaline aqueous solution, no antioxidant need be added when such a removal procedure is practised.

The present invention will now be described in more detail with reference to various preferred procedures, which are by way of example only.

First, meat or internal organs of esculent animals are mixed with several times as much water. The mixture is homogenized sufficiently, and the pH of the mixture is adjusted to 12 with caustic soda solution, to dissolve alkali-soluble protein. This liquid is subjected to separation by means of a centrifuge. After removal of the insoluble portion and fats, pH of the liquid is lowered to about 5.0 with hydrochloric acid. The precipitating protein is collected by means of a centrifuge. Protein separation may be effected by combining a dissolving procedure and a precipitating procedure. Meanwhile, the temperature should be kept lower than 50°C to avoid thermal denaturalization and decomposition. A quantity of the protein thus prepared (alone or in admixture) and a quantity of at least one unsaturated fatty acid and/or nontoxic salt thereof are placed in water, together with antioxidants if necessary. While the solution is being homogenized sufficiently, pH and the temperature are suitably adjusted. The protein solution thus obtained is high in viscosity and contains large quantities of entrapped air. Defoaming is effected under reduced pressure. The protein solution after defoaming is a highly viscous liquid with good thread-forming properties. According to a conventional procedure, this liquid is extruded through a spinneret, having a large number of fine orifices and washed with water to obtain fibrous protein.

The highly viscous spinning solution is extruded by using a spinneret having about 500 fine orifices with 0.05 to 0.3 mm diameter, for example, a rayon spinneret, into a coagulation bath. The coagulation is usually carried out in an acidic bath around pH 2 to 5. If the bath contains only acids, swelling of the fibers may occur, so that stretching thereof is rendered impossible. Hence, about 20 percent of salts such as $Na_2SO_4$ or $MgSO_4$ are dissolved in the coagulation bath in order to make the stretching treatment possible.

Stretching treatment is effected to an extent of from 150 to 500 percent of the original length. If the stretching is insufficient, resistance to the teeth is unsatisfactory on eating food products made up from the fibers, due to the low tensile strength of the fibers. Furthermore, low stretched fibers have many drawbacks in the after-treatment thereof. The stretched fibers are then immersed in a second bath of approximately neutral salt solution containing more than 10 percent of $Na_2SO_4$, $MgSO_4$, etc. to effect further stretching or for washing out acids contained in the fibers. The temperature of the coagulation bath and the second bath, which may be variable depending on the temperature of the protein, is desirably from 40° to 70°C. By washing the fibers obtained from the second bath with water, fibers with about 20 percent protein content (calculated on dry protein) are obtained. For the purpose of removing unsaturated acids contained in the fibers, the fibers are preferably treated with a 70 percent water containing alcohol or alkaline aqueous alcoholic solution. In the present invention, no dry spinning method can be applied.

Recently, many attempts have been made to make use of soybean protein as a plant protein source for foods in Europe, America and Japan. The commercially available products may largely be classified into three types, i.e., power type, extruded type and spun type. However, the power type has only a negative effect on texture of food and the extruded type is also inferior in texture. In this respect, the spun type is most excellent and expected to be most promising in the future. Nevertheless, soybean protein possesses a peculiar beany flavor and has drawbacks in that it is low in retention of water as well as taste.

The protein fiber obtained by the present invention possesses the following characteristics:

1. good elasticity,
2. seasoning liquids easily penetrate and hardly escape,
3. no drying deterioration,
4. good retention of water.

In accordance with the present invention, fibrous protein wherein plant protein is admixed with animal protein at any desired ratio can be produced. Therefore, the present invention is characteristic in that the defects of the former can be removed by suitable mixing with the latter.

Furthermore, the present invention is also advantageous in that animal proteins contained in such portions as mentioned above can be converted into proteins with added values. That is, animal protein found in any portion of animal bodies can be solubilized, spun into fibers and further treated to obtain products having texture and taste which is approximate to those of true meat.

The fibrous protein obtained according to the present invention may be directly used in hams, sausages, hamburgers, etc. In addition, it may be admixed with protein such as the white of an egg or casein, starch, animal fats or shortenings, suitably seasoned with spices, arranged in various shapes and heat treated to provide fancy food products. It may further be served for many other purposes, just as meat can. Furthermore, as a new food, other uses may also be expected of this fibrous protein.

The present invention is further illustrated by the following Examples.

EXAMPLE 1

Six liters of water are added to 1.2 kg (about 300 g. when dried) of ox heart. The liquid, adjusted to pH 12 while being well homogenized, is separated by a continuous refrigerated centrifuge; fats and the precipitates are removed. The transparent liquid thus obtained is adjusted to pH 5.0 with stirring by addition of hydrochloric acid. About 1.8 kg. (about 250 g when dried) of pastel-like ox heart protein is separated from the liquid by means of a centrifuge. To this paste are added 20g. linoleic acid and 2.8 l water. The liquid is kept at 40°C and, while being homogenized sufficiently, adjusted to pH 11. Then defoaming is effected under reduced pressure. The thread-forming length is measured for this dope according to the method described in Experiment 1 and found to be about 40cm. This dope is extruded through a spinning orifice having 500 nozzles with 0.1 mm. diameter into a coagulation bath containing 2 percent sulfuric acid, 15 percent sulfate of soda and 5 percent $MgSO_4.7 H_2O$, and thereafter washed with water. 1.23 kg of protein fibers, which are elastic and homogeneous, having a water content of about 80 percent with diameters of from about 0.05 to 0.1 mm are obtained. A similar dope prepared without linoleic acid has little thread-forming property, so that no homogeneous fine fibers can be obtained therefrom.

EXAMPLE 2

Twelve liters of water are added to 3 kg. of pork (about 600 g when dried) containing little lard. According to the same procedure as described in Example 1, about 3 kg. of paste of pork protein (about 450 g when dried) are obtained. About 45 g. sodium linolenate and 2 l of water are added to said paste. The liquid, while being kept at 40°C and homogenized, is adjusted to pH 12 and defoamed. The thread-forming length of the dope prepared is about 35cm. The dope is similarly treated as in Example 1 to obtain 2.0 kg of pork protein fibers with 0.05 to 0.1 mm diameters.

EXAMPLE 3

About 1.3 kg. (about 200 g when dried) of paste mainly composed of liver protein are obtained according to the same procedure as described in Example 1 except that 7 l of water is added to 1.5 kg. (about 300 g when dried) of hog-liver. Said paste is admixed with about 30g. potassium oleate and 1.2 l of water and, while being homogenized at 40°C, adjusted to pH 11.8. After sufficient defoaming, a dope with thread-forming length of about 40cm. is obtained. Said dope is similarly treated as in Example 1 to obtain 1.2 kg of liver protein fibers with 0.05 to 0.1 mm diameters. The thus obtained fibrous protein is passed through 70 percent ethanolic solution, whereby almost all the amount of oleic acid is removed.

From a similar dope with no addition of oleic acid, no such fibers can be obtained.

EXAMPLE 4

Commercially available raw soybeans are crushed, thoroughly exoleated with n-hexane and dried in air at a temperature not higher than 60°C until the smell of the solvent has vanished. They are then immersed into a large amount of pH 7.17 phosphoric acid buffer solution to elute protein. The upper supernatant obtained by centrifuge is adjusted to pH 4.3 by addition of HCl. to precipitate protein. After the precipitate is left to stand overnight, the supernatant is removed by means of a centrifuge. The precipitate is again dissolved in phosphoric acid buffer solution and reprecipitated with HCl The precipitate is left to stand overnight, and thereafter protein is separated by centrifuge. The thus obtained paste-like protein is used for the following experiment.

To one kg. of the above pastelike soybean protein (about 300 g when dried), is added 2 kg of pork protein paste (about 300 g when dried), which is obtained as in Example 2. Into the mixture are further added 50g of the ammonium salt of arachidonic acid and 3.2 l of water. The liquid, while being homogenized at 40°C is adjusted to pH 11.7. After sufficient defoaming, a dope with thread-forming length of 30cm is obtained. Said dope is spun as in Example 1 to obtain 2.4 kg of fibrous protein wherein equal amounts of pork protein and soybean protein are admixed. This fiber is passed through a 90 percent ethanol to remove nearly all of the arachidonic acid.

EXAMPLE 5

15 litres of water is added to 4 kg. of freezed minced flesh of a pollack (a material used for fish sausage called "Kamabake" which is prepared by dipping flesh of a pollack into ten times the quantity of water to effect washing, thereafter removing water by centrifuge, mincing the flesh in a mincing machine and freezing the minced flesh with addition of 0.2 percent polyphosphate solution and 5 percent sucrose or sorbitol solution). The mixture is adjusted to pH 12, while being homogenized, and subjected to centrifugal separation. The upper supernatant is adjusted to pH 4.5 to precipitate protein. To 4kg. of the paste obtained (about 650g when dried) are added 30g clupanodonic acid, 45 g. barium linoleate and 4 l of water. The mixture is kept at 45°C and adjusted to pH 11.8, while being homogenized. After defoaming is completed, a spinning dope with thread-forming length of 30cm is obtained. Said dope is spun as in Example 1 to obtain 3.0kg of fibrous protein having diameters of from 0.05 to 0.1mm which has extremely good elasticity.

3 kg. of the soybean protein paste obtained in Example 4 (about 900 g when dried), 1.5 of the pollack protein paste obtained in this Example (about 220 g when dried), 45 g of linoleic acid, and 5.5 litres of water, are sufficiently homogenized while being maintained at 40°C, and adjusted to pH 12. After defoaming, fibrous protein containing about 20 percent of fish meat and about 80 percent of soybean protein is obtained by the procedure described in Example 1. This product is a fiber which is more elastic and firmly flexible compared with the product composed of soybean protein alone.

EXAMPLE 6

12 litres of water is added to 3kg. of chicken meat (about 600 g when dried). From this mixture, about 3 kg. of meat protein paste (about 470g when dried) are obtained according to the same procedure as in Example 1. To said paste are added 40g palmitoleic acid, 40 g. myristoleic acid and 3 l of water. While being homogenized at 40°C, the mixture is adjusted to pH 12 and defoamed to obtain a dope with thread-forming length of about 30cm. The dope is spun as in Example 1 to obtain 2.2kg of meat protein fibers. The thus obtained fibrous protein is passed through 50 percent water-containing ethanolic solution with pH 9, whereby the unsaturated fatty acid can be removed perfectly.

EXAMPLE 7

Meat attached to an ox bone is treated as in Example 1 to obtain about 3 kg. of beef protein paste (about 450g, when dried). About 50g aluminium linolenate and 2.5 l of water are added to said paste. The mixture is kept at 40°C and adjusted to pH 12, while being homogenized. After defoaming, a dope with a thread-forming length of 35 cm is obtained. Said dope is spun as in Example 1 to obtain 2.1 kg of beef protein fibers with 0.05 to 0.1 mm. diameter.

EXAMPLE 8

To 300 g. of paste (about 45g when dried) obtained similarly as in Example 7 and 2.7 kg of the soybean protein paste (400 g. when dried) obtained as in Example 4 are added 10g. linoleic acid and 1 l of water. From this mixture, 2.3 kg of a mixed fibrous protein containing 90 percent soybean protein and 10 percent beef protein is obtained according to the same procedure as described in Example 2.

EXAMPLE 9

Ten liters of water are added to 2 kg. of ox lung (about 400 g. when dried). From this mixture, about 1.2 kg. of lung protein paste (about 200 g when dried) is obtained according to the procedure described in Example 1. By use of this protein paste, 980g of lung protein fibers can be obtained according to the procedure described in Example 3.

EXAMPLE 10

According to the procedure described in Example 1, about 1.4 kg. of kidney protein paste (about 250g when dried) are obtained from a mixture of 2kg. of ox kidney (about 400 g when dried) and 10 l of water. The mixture is kept at 40°C and, while being thoroughly homogenized, adjusted to pH 12. After defoaming, a dope with thread-forming length of 35cm is obtained. This dope is treated as in Example 1 to obtain 1.2 kg of fibrous kidney protein.

We claim:

1. A process for producing fibrous protein from a solution of protein of animal origin or of protein of animal origin and vegetable origin by extruding an aqueous solution of protein into a coagulation bath, which comprises forming an aqueous protein solution at a pH of from 10 to 12 and at a temperature of from 30° to 60°C., said solution containing from 5 to 15 percent by weight of protein when the protein is of animal origin and from 5 to 20 percent by weight when the protein is of animal and vegetable origins, adding to said aqueous protein solution from 2 to 80 percent by weight, based upon the protein of animal origin content of said aqueous protein solution, of at least one unsaturated fatty acid having from 14 to 22 carbon atoms or at least one non-toxic salt thereof, agitating the resulting mixture and defoaming said mixture, whereupon a viscous solution is formed, extruding said viscous solution into a coagulation bath maintained at a pH of from about 2 to about 5 and containing at least one inorganic salt, thereby obtaining threads of protein, and stretching said threads to from 150 to 500 percent of their original length.

2. A process according to claim 1, wherein said protein of animal origin is derived from at least one of the group consisting of meat portions, internal organs, blood, eggs and roe of esculent animals.

3. A process according to claim 1, said protein of vegetable origin is derived from at least one of the group consisting of soybean, peanut and cotton seed.

4. A process according to claim 1 wherein said protein of vegetable origin is obtained by
    1. solubilizing vegetable matter defatted at low temperature,
    2. effecting precipitation by an isoelectric or salting out method.

5. A process according to claim 1, wherein said protein of animal origin is obtained by
    1. solubilizng animal matter in alkaline solution,
    2. effecting precipitation by an isoelectric or salting out method.

6. A process according to claim 1, wherein said protein of animal origin is obtained by solubilizing animal matter with collagenase.

7. A process according to claim 1, wherein said unsaturated fatty acid is selected from the group consisting of myristoleic acid, palmitoleic acid, oleic acid, linoleic acid, linolenic acid, arachinodic acid, and clupadonic acid.

8. A process according to claim 1, wherein said non-toxic salts of said unsaturated fatty acid are selected from the group consisting of ammonium, sodium, potassium, calcium, magnesium, barium and aluminium salts.

9. A process according to claim 1, wherein said fibers after spinning are washed in an alcoholic solution containing 70 percent or more alcohol to remove said unsaturated fatty acid.

10. A process according to claim 1, wherein said fibers after spinning are washed in an alkaline aqueous alcoholic solution to remove said unsaturated fatty acid.

11. The process of claim 1, wherein said aqueous protein solution contains protein of animal origin.

12. The process of claim 1, wherein said aqueous protein solution contains protein of animal origin and of vegetable origin.

13. The process of claim 1, wherein the protein of said aqueous protein solution has a purity of at least 85 percent by weight.

14. The process of claim 1, wherein the temperature of said coagulation bath is from 40° to 70°C.

15. The process of claim 1, wherein said acid is linoleic acid.

16. The process of claim 1, wherein said salt is sodium linolenate.

17. The process of claim 1, wherein said salt is potassium oleate.

18. The process of claim 1, wherein said salt is the ammonium salt of arachidonic acid.

19. The process of claim 1, wherein said salt is barium linoleate.

20. The process of claim 1, wherein said acid comprises a mixture of palmitoleic and myristoleic.

21. The process of claim 1, wherein said salt is aluminum linolenate.

* * * * *

UNITED STATES PATENT OFFICE
CERTIFICATE OF CORRECTION

PATENT NO. : 3,843,803
DATED : October 22, 1974
INVENTOR(S) : NOBUMITSU YANO et al It is certified that error appears in the above-identified patent and that said Letters Patent are hereby corrected as shown below:

Column 10, Claim 7, last line:

replace "clupadonic" with --- clupanodonic ---.

Column 10, line 25:

replace "solubilizng" with --- solubilizing ---.

Signed and sealed this 3rd day of June 1975.

(SEAL)
Attest:

RUTH C. MASON
Attesting Officer

C. MARSHALL DANN
Commissioner of Patents
and Trademarks